United States Patent
Orchard

(10) Patent No.: US 11,618,187 B2
(45) Date of Patent: Apr. 4, 2023

(54) TOOLING TO ENABLE VARIATION IN RADIUS OF MOLDED CONTINUOUS FIBER REINFORCED POLYMER CURVED COMPONENTS

(71) Applicant: Airbus SAS, Blagnac (FR)

(72) Inventor: Matthew Noel Orchard, Blagnac (FR)

(73) Assignee: AIRBUS SAS, Blagnac (FR)

( * ) Notice: Subject to any disclaimer, the term of this patent is extended or adjusted under 35 U.S.C. 154(b) by 276 days.

(21) Appl. No.: 16/867,686

(22) Filed: May 6, 2020

(65) Prior Publication Data

US 2020/0353655 A1    Nov. 12, 2020

Related U.S. Application Data

(60) Provisional application No. 62/844,945, filed on May 8, 2019.

(51) Int. Cl.
| | |
|---|---|
| *B29C 43/04* | (2006.01) |
| *B29C 43/02* | (2006.01) |
| *B29C 70/16* | (2006.01) |
| B29L 31/30 | (2006.01) |
| B29K 307/04 | (2006.01) |
| B29K 105/08 | (2006.01) |

(52) U.S. Cl.
CPC ............ *B29C 43/04* (2013.01); *B29C 43/021* (2013.01); *B29C 70/16* (2013.01); *B29K 2105/08* (2013.01); *B29K 2307/04* (2013.01); *B29K 2995/0082* (2013.01); *B29L 2031/3082* (2013.01)

(58) Field of Classification Search
None
See application file for complete search history.

(56) References Cited

U.S. PATENT DOCUMENTS

2013/0142997 A1* 6/2013 Hofmann ................ B29C 48/09
428/156

* cited by examiner

*Primary Examiner* — Robert J Grun
(74) *Attorney, Agent, or Firm* — Greer, Burns & Crain, Ltd.

(57) ABSTRACT

A tooling to enable variation in radius of molded continuous fiber reinforced polymer curved components which includes a first tooling surface formed on a first tooling member which may be formed of sprung material, a second tooling surface formed on a second tooling member which may be formed of sprung material. The first tooling surface and the second tooling surface are positioned to lie one over the other to form a gap therebetween for receiving a supply of continuous fiber reinforced polymer. The first tooling surface and the second tooling surface are movable towards and away from each other to modify the size of the gap therebetween and thereby modify the amount of compression applied by the first and second tooling surfaces on the continuous fiber reinforced polymer positioned therebetween. A mechanism is engaged with the first tooling member to modify a curvature of the first tooling surface.

9 Claims, 3 Drawing Sheets

TOOLING TO ENABLE VARIATION IN RADIUS OF MOLDED CONTINUOUS FIBER REINFORCED POLYMER CURVED COMPONENTS

CROSS-REFERENCES TO RELATED APPLICATIONS

This application claims the benefit of the Provisional U.S. patent application Ser. No. 62/844,945 filed May 8, 2019, the entire disclosures of which are incorporated herein by way of reference.

FIELD OF THE INVENTION

The present invention is directed to a device which enables variation in the radius of molded continuous fiber reinforced polymer (CFRP) curved components.

BACKGROUND OF THE INVENTION

To reduce costs and weight of CFRP aircraft, it is typically better to have more integrated components with fewer joints and parts, and, where possible, a continuous production/molding system is highly advantageous to achieve this.

Continuous CFRP molding has been achieved typically with constant section, straight parts, such as rails, stringers, cross beams and the like for aircraft, but where geometries vary such as fuselage frames (typically curved, or even of circular shape) this is not easy in a continuous process and other processes like 1-shot press forming are often used. One of the difficulties of continuous molding is usually the tooling only enables constant geometries, such as straight components or constant curvature, which restricts the applicability of the technology.

Specifically in aircraft manufacture expanding the continuous molding to fuselage frames would create an opportunity to reduce cost and also reduce product complexity. However, typically for effective useable fuselage volumes, as shown in FIG. 1, the cross-section of the fuselage 20 and hence the fuselage frames is not circular, but multi-lobe with different radii R1, R2, R3 used around the circumference. This would discount traditional continuous molding tooling being used for such components, including applicability for non-aviation applications, except in the case the frame was split into multiple sections with mechanical joints that add cost and complexity.

SUMMARY OF THE INVENTION

A tooling is provided to enable variation in radius of molded continuous fiber reinforced polymer curved components which includes a first tooling surface formed on a first tooling member of sprung metal material, a second tooling surface formed on a second tooling member of sprung metal material. The first tooling surface and the second tooling surface are positioned to lie one over the other to form a gap therebetween for receiving a supply of continuous fiber reinforced polymer. The first tooling surface and the second tooling surface are movable towards and away from each other to modify the size of the gap therebetween and thereby modify the amount of compression applied by the first and second tooling surfaces on the continuous fiber reinforced polymer positioned therebetween. A mechanism is engaged with the first tooling member to modify a curvature of the first tooling surface.

In an embodiment of the invention, a tooling is provided to enable variation in radius of molded continuous fiber reinforced polymer curved components. The tooling comprises a first tooling surface formed on a first tooling member of sprung metal material. The first tooling member has a first pin therethrough located along a length of the first tooling member and a second pin therethrough located along the length, spaced from the first pin. A second tooling surface is formed on a second tooling member of sprung material. The second tooling member has a first pin therethrough located along a length of the second tooling member and a second pin therethrough located along the length, spaced from the first pin. The first tooling surface and the second tooling surface are positioned to lie one over the other to form a gap therebetween for receiving a supply of continuous fiber reinforced polymer. The first tooling surface and the second tooling surface are movable towards and away from each other to modify the size of the gap therebetween and thereby modify the amount of compression applied by the first and second tooling surfaces on the continuous fiber reinforced polymer positioned therebetween. The second pin of each tooling surface is movable towards and away from the first pin of each tooling surface to cause a greater or lesser degree of bending of each of the tooling members and tooling surfaces dependent upon the movement.

In an embodiment, the first pin of the first tooling member and the first pin of the second tooling member are fixed in place and not movable.

In an embodiment, the first pin of the first tooling member and the first pin of the second tooling member are movable towards and away from the second pin of the first tooling member and the second pin of the second tooling member, respectively.

In an embodiment, a tooling is provided to enable variation in radius of molded continuous fiber reinforced polymer curved components. The tooling comprises a first tooling surface formed on a first tooling member of flexible material. A second tooling surface is formed on a second tooling member of flexible material. The first tooling surface and the second tooling surface are positioned to lie one over the other to form a gap therebetween for receiving a supply of continuous fiber reinforced polymer. The first tooling member has a plurality of actuators located along a length of the first tooling member which are configured to press against the first tooling member to cause a movement of portions of the first tooling surface in a direction perpendicular to the length of the first tooling member and towards and away from the second tooling surface. The second tooling member has a plurality of actuators located along a length of the second tooling member which are configured to press against the second tooling member to cause a movement of portions of the second tooling surface in a direction perpendicular to the length of the second tooling member and towards and away from the first tooling surface. The first tooling member and the second tooling member are movable towards and away from each other to modify the size of the gap therebetween and thereby modify the amount of compression applied by the first and second tooling surfaces on the continuous fiber reinforced polymer positioned therebetween.

In an embodiment, the first tooling member is formed of a sprung metal material.

In an embodiment, the second tooling member is also formed of a sprung metal material.

In an embodiment, a tooling is provided to enable variation in radius of molded continuous fiber reinforced polymer curved components. The tooling comprises a first tooling surface formed on a first tooling member of flexible material. A second tooling surface is formed on a second tooling member. The first tooling surface and the second tooling surface are positioned to lie one over the other to form a gap therebetween for receiving a supply of continuous fiber reinforced polymer. The first tooling member has a plurality of actuators located along a length of the first tooling member which are configured to press against the first tooling member to cause a movement of portions of the first tooling surface in a direction perpendicular to the length of the first tooling member and towards and away from the second tooling surface. The first tooling member is movable towards and away from the second tooling member to modify the size of the gap therebetween and thereby modify the amount of compression applied by the first and second tooling surfaces on the continuous fiber reinforced polymer positioned therebetween.

In an embodiment, the second tooling member is formed of a flexible material.

In an embodiment, the second tooling member has a plurality of actuators located along a length of the second tooling member which are configured to press against the second tooling member to cause a movement of portions of the second tooling surface in a direction perpendicular to the length of the second tooling member and towards and away from the first tooling surface.

In an embodiment, the second tooling member is movable towards and away from the first tooling member to modify the size of the gap therebetween and thereby modify the amount of compression applied by the first and second tooling surfaces on the continuous fiber reinforced polymer positioned therebetween.

DETAILED DESCRIPTION OF THE PREFERRED EMBODIMENTS

To overcome the limitation of conventional continuous molding, the present invention provides an adjustable component of the mold tooling mounted to the conventional fixed base element of the tooling to change the mold shape as needed without stopping the continuous process. This change in mold shape can occur every time the mounting plate of the mold moves away from the component.

A tooling to enable variation in radius of molded continuous fiber reinforced polymer curved components which includes a first tooling surface formed on a first tooling member of sprung material, a second tooling surface formed on a second tooling member of sprung material. The sprung material may be formed from a composite material, a polymer, a metal, or other similar materials. The first tooling surface and the second tooling surface are positioned to lie one over the other to form a gap therebetween for receiving a supply of continuous fiber reinforced polymer. The first tooling surface and the second tooling surface are movable towards and away from each other to modify the size of the gap therebetween and thereby modify the amount of compression applied by the first and second tooling surfaces on the continuous fiber reinforced polymer positioned therebetween. A mechanism is engaged with the first tooling member to modify a curvature of the first tooling surface.

Figure 1:
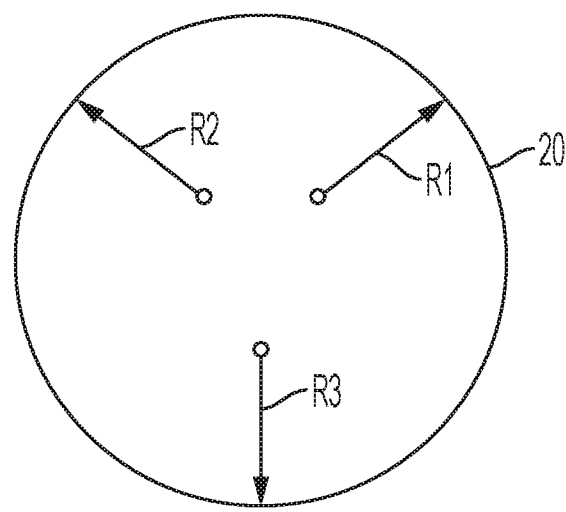
FIG. 1 is a schematic cross sectional view of a CFRP component in the form of an aircraft fuselage.
Figure 2:
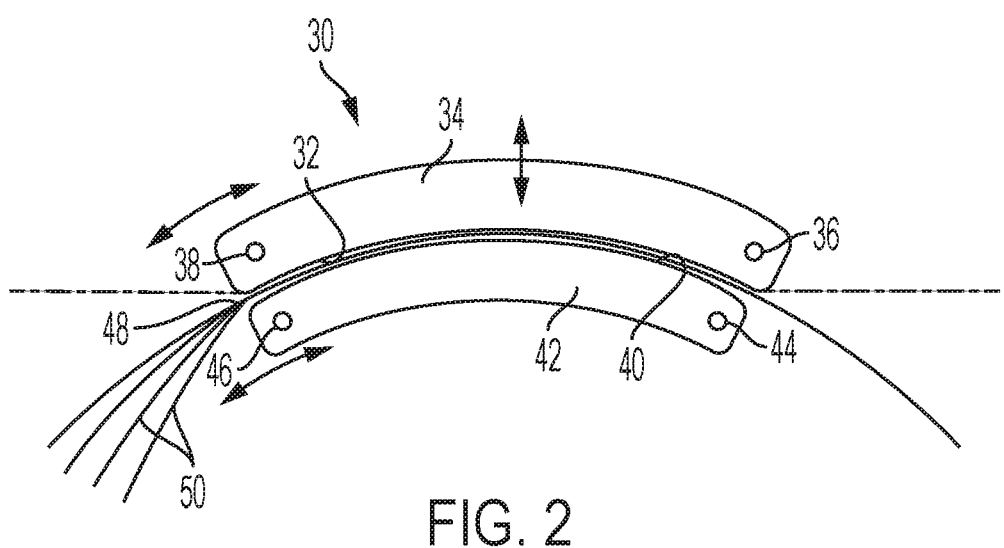
FIG. 2 is schematic side elevational view of an Adjustable CFRP continuous molding tooling via pinned sprung elements.

FIG. 2 shows one variation of the concept, where one end of the movable tooling surface, made from a sprung material (like spring steel), is fixed with a static pin, and the other end of the tooling has a pin that can translate towards or away from the fixed pin. The tooling surface on both sides of the moving base (that provides the compression force) can then be varied by moving the pin that can translate with a suitably strong actuator to translate the pin in each direction, which in turn changes the curvature of the tooling surface.

This embodiment of the invention has the benefit that it is not unduly complex and therefore can be both robust and lower cost. It will require allowance for the potential of loss of compressive force at the point farthest from the two pins, by ensuring sufficient spring loading of the sprung tooling surface. It is also most suited for a constant thickness molding.

Specifically, in the embodiment of the invention shown in FIG. 2, a tooling 30 is provided to enable variation in radius of molded continuous fiber reinforced polymer curved components. The tooling 30 comprises a first tooling surface 32 formed on a first tooling member 34 of sprung material. The first tooling member 34 has a first pin 36 therethrough located along a length of the first tooling member 34 and a second pin 38 therethrough located along the length, spaced from the first pin. A second tooling surface 40 is formed on a second tooling member 42 of sprung material. The second tooling member 42 has a first pin 44 therethrough located along a length of the second tooling member and a second pin 46 therethrough located along the length, spaced from the first pin. The first tooling surface 32 and the second tooling surface 40 are positioned to lie one over the other to form a gap 48 therebetween for receiving a supply of continuous fiber reinforced polymer 50. The first tooling surface 32 and the second tooling surface 40 are movable towards and away from each other to modify the size of the gap 48 therebetween and thereby modify the amount of compression applied by the first and second tooling surfaces on the continuous fiber reinforced polymer 50 positioned therebetween. The second pin 38, 46 of each tooling surface 32, 40 is movable towards and away from the first pin 36, 44 of each tooling surface to cause a greater or lesser degree of bending of each of the tooling members 34, 42 and tooling surfaces dependent upon the movement.

In an embodiment, the first pin 36 of the first tooling member 34 and the first pin 44 of the second tooling member 42 are fixed in place and not movable.

In an embodiment, the first pin 36 of the first tooling member 34 and the first pin 44 of the second tooling member 42 are movable towards and away from the second pin 38 of the first tooling member and the second pin 46 of the second tooling member, respectively.

Figure 3:
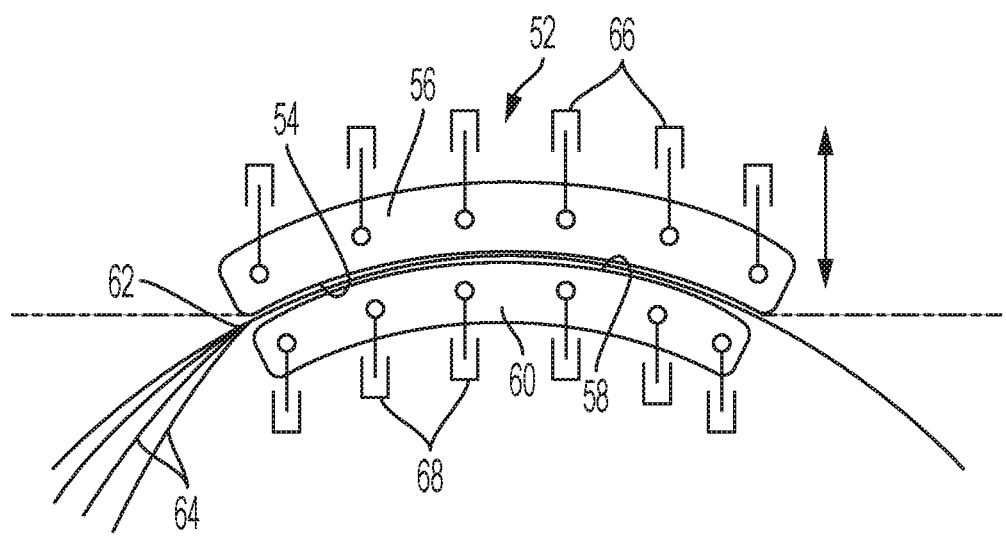
FIG. 3 is a schematic side elevational view of a multi-actuator mold tool.

A different embodiment of the invention is to replace the translating pin arrangement with a series of actuators to position each half of the tooling surface in relation to each other, represented in FIG. 3. The compression for the molding can, in this case, either be created by the movement of two separate base plates forming the mounting of each side of the mold (as shown in FIG. 3), or it is also possible to have a fixed base and the actuators to both form the tooling shape and to also create the uniform movement to create the compression for the molding action.

In this variation of the innovation, the tooling surface does not have to be of sprung material (but may still be sprung), and as there are multiple supports, may be of lighter manufacture. This variation also has the potential, through varied use of the actuators, to continually vary the gap between the two tooling surfaces, thereby enabling ramp-up and ramp-down of the thickness in the direction of movement of the material. It can also be imagined to have more than one actuated tooling surface so that the thickness variation can be independently controlled in a stepped manner in the axis coming out of the page in FIG. 3.

Specifically, as shown in FIG. 3, a tooling 52 is provided to enable variation in radius of molded continuous fiber reinforced polymer curved components 53. The tooling 52 comprises a first tooling surface 54 formed on a first tooling member 56 of flexible material. A second tooling surface 58 is formed on a second tooling member 60 of flexible material. The first tooling surface 54 and the second tooling surface 58 are positioned to lie one over the other to form a gap 62 therebetween for receiving a supply of continuous fiber reinforced polymer 64. The first tooling member 56 has a plurality of actuators 66 located along a length of the first tooling member which are configured to press against the first tooling member to cause a movement of portions of the first tooling surface 54 in a direction perpendicular to the length of the first tooling member and towards and away from the second tooling surface 58. The second tooling member 60 has a plurality of actuators 68 located along a length of the second tooling member which are configured to press against the second tooling member to cause a movement of portions of the second tooling surface 58 in a direction perpendicular to the length of the second tooling member and towards and away from the first tooling surface 54. The first tooling member 56 and the second tooling member 60 are movable towards and away from each other to modify the size of the gap 62 therebetween and thereby modify the amount of compression applied by the first 54 and second 58 tooling surfaces on the continuous fiber reinforced polymer 64 positioned therebetween.

In an embodiment, the first tooling member 56 is formed of a sprung metal material.

In an embodiment, the second tooling member 60 is also formed of a sprung metal material.

The embodiment of the invention in FIG. 3 also has the possibility to vary the curvature in both convex and concave manner if carefully designed, which could be utilized to create quite complex double curvature shapes.

Figure 4:
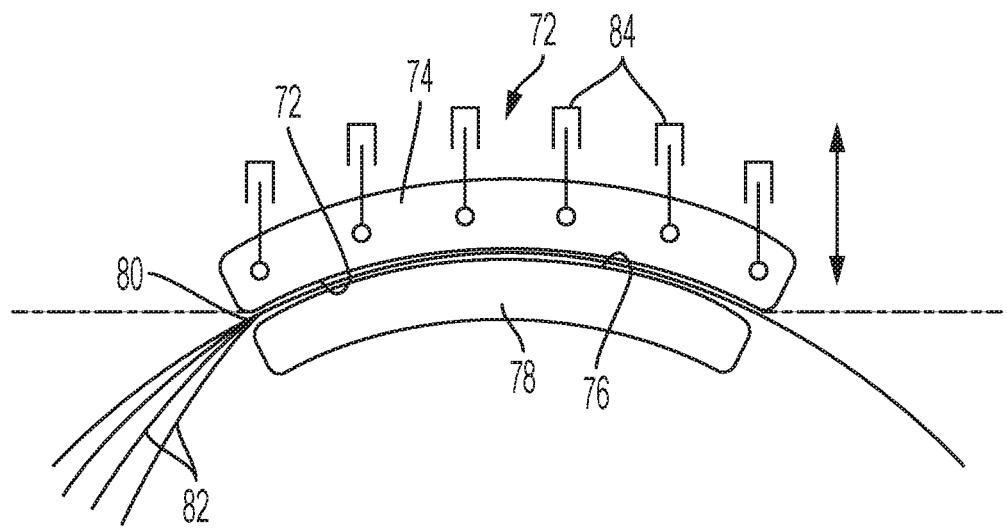
FIG. 4 is a schematic side elevational view of another embodiment of a multi-actuator mold tool.

In a third embodiment, as shown in FIG. 4, a tooling 70 is provided to enable variation in radius of molded continuous fiber reinforced polymer curved components. The tooling 70 comprises a first tooling surface 72 formed on a first tooling member 74 of flexible material. A second tooling surface 76 is formed on a second tooling member 78. The first tooling surface 72 and the second tooling surface 76 are positioned to lie one over the other to form a gap 80 therebetween for receiving a supply of continuous fiber reinforced polymer 82. The first tooling member 74 has a plurality of actuators 84 located along a length of the first tooling member which are configured to press against the first tooling member to cause a movement of portions of the first tooling surface 72 in a direction perpendicular to the length of the first tooling member and towards and away from the second tooling surface 76. The first tooling member 74 is movable towards and away from the second tooling member 78 to modify the size of the gap 80 therebetween and thereby modify the amount of compression applied by the first 72 and second 76 tooling surfaces on the continuous fiber reinforced polymer 82 positioned therebetween.

Although in FIG. 4 the actuators 84 are shown on the outer side of the curvature of the curved component being made, alternatively, the actuators 84 could instead be placed on the tooling member on the inside of the curvature of the curved component being made.

In the embodiment of FIG. 4, the second tooling member 78 is formed of a flexible material.

In an embodiment, as shown in FIG. 3, and described above, the second tooling member 78 may also have a plurality of actuators located along a length of the second tooling member which are configured to press against the second tooling member to cause a movement of portions of the second tooling surface 76 in a direction perpendicular to the length of the second tooling member and towards and away from the first tooling surface 72.

In an embodiment, as discussed with respect to FIG. 3, the second tooling member 78 is movable towards and away from the first tooling member 74 to modify the size of the gap 80 therebetween and thereby modify the amount of compression applied by the first 72 and second 76 tooling surfaces on the continuous fiber reinforced polymer 82 positioned therebetween.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A tooling to enable variation in radius of molded continuous fiber reinforced polymer curved components comprising:
    a first tooling surface formed on a first tooling member,
    a second tooling surface formed on a second tooling member,
    the first tooling surface and the second tooling surface being positioned to lie one over the other to form a gap therebetween for receiving a supply of continuous fiber reinforced polymer,
    the first tooling surface and the second tooling surface being movable towards and away from each other to modify a size of the gap therebetween and thereby modify the amount of compression applied by the first and second tooling surfaces on the continuous fiber reinforced polymer positioned therebetween, and
    a mechanism engaged with the first tooling member to modify a curvature of the first tooling surface,
    wherein the mechanism comprises a first pin extending through the first member located along a length of the first member and a second pin extending through the first member located along the length, spaced from the first pin, wherein the second pin is movable towards and away from the first pin to cause a greater or lesser degrees of bending of the first member and first tooling surface dependent upon movement of the second pin towards and away from the first pin.

2. The tooling according to claim 1, wherein the mechanism further comprises a first pin extending through the second member located along a length of the second member and a second pin extending through the second member located along the length, spaced from the first pin, wherein the second pin is movable towards and away from the first pin to cause a greater or lesser degrees of bending of the second member and second tooling surface dependent upon movement of the second pin towards and away from the first pin.

3. The tooling according to claim 1, wherein the first tooling member is formed of sprung material.

4. The tooling according to claim 1, wherein the second tooling member is formed of sprung material.

5. A tooling to enable variation in radius of molded continuous fiber reinforced polymer curved components comprising:
- a first tooling surface formed on a first tooling member, the first tooling member having a first pin therethrough located along a length of the member and a second pin therethrough located along the length, spaced from the first pin,
- a second tooling surface formed on a second tooling member, the second tooling member having a first pin therethrough located along a length of the member and a second pin therethrough located along the length, spaced from the first pin,
- the first tooling surface and the second tooling surface being positioned to lie one over the other to form a gap therebetween for receiving a supply of continuous fiber reinforced polymer,
- the first tooling surface and the second tooling surface being movable towards and away from each other to modify a size of the gap therebetween and thereby modify an amount of compression applied by the first and second tooling surfaces on the continuous fiber reinforced polymer positioned therebetween,
- the second pin of each tooling surface being movable towards and away from the first pin of each tooling surface to cause a greater or lesser degree of bending of each of the tooling members and tooling surfaces dependent upon the movement of the second pins towards and away from the first pins.

6. The tooling according to claim 5, wherein the first pin of the first tooling member and the first pin of the second tooling member are fixed in place and not movable.

7. The tooling according to claim 5, wherein the first pin of the first tooling member and the first pin of the second tooling member are movable towards and away from the second pin of the first tooling member and the second tooling member, respectively.

8. The tooling according to claim 5, wherein the first tooling member is formed of sprung material.

9. The tooling according to claim 5, wherein the second tooling member is formed of sprung material.

\* \* \* \* \*